(12) United States Patent　　(10) Patent No.:　　US 12,561,697 B2

Løken　　(45) Date of Patent:　　*Feb. 24, 2026

(54) METHOD FOR ESTABLISHING NETWORK CONNECTIONS BETWEEN A CLIENT, AN ORIGINATING TRACEABILITY APPLICATION AND A FIRST COMPUTER SYSTEM IN A NETWORK AND EVOKING FUNCTIONS ON DATA FROM BOTH SYSTEMS

(71) Applicant: KEZZLER AS, Oslo (NO)

(72) Inventor: Magnar Løken, Oslo (NO)

(73) Assignee: KEZZLER AS, Oslo (NO)

( * ) Notice: Subject to any disclaimer, the term of this patent is extended or adjusted under 35 U.S.C. 154(b) by 419 days.

This patent is subject to a terminal disclaimer.

(21) Appl. No.: 18/108,490

(22) Filed: Feb. 10, 2023

(65) Prior Publication Data

US 2024/0273543 A1　　Aug. 15, 2024

Related U.S. Application Data

(63) Continuation-in-part of application No. 17/402,183, filed on Aug. 13, 2021, now Pat. No. 12,141,745.

(51) Int. Cl.
　　*G06Q 30/018*　　(2023.01)
　　*H04L 61/5046*　　(2022.01)
　　*H04L 67/12*　　(2022.01)

(52) U.S. Cl.
　　CPC ....... *G06Q 30/018* (2013.01); *H04L 61/5046* (2022.05); *H04L 67/12* (2013.01)

(58) Field of Classification Search
　　CPC .... G06Q 10/087; G06Q 10/08; G06Q 20/203;

G06Q 30/0223; G06Q 10/0833; G06Q 10/00; G06Q 10/083; G06Q 10/10; G06Q 30/018; G06Q 30/02; G06Q 30/0281; G06Q 30/06; Y04S 10/56; G06F 16/955; H04L 67/563; H04L 63/10; H04L 67/306;

(Continued)

(56) References Cited

U.S. PATENT DOCUMENTS 8,423,770 B2　　4/2013　Loeken
8,700,501 B2　　4/2014　Loeken (Continued)

FOREIGN PATENT DOCUMENTS

EP　　4 060 525 A1　　9/2022
FR　　3 102 279 A1　　4/2021

(Continued)

OTHER PUBLICATIONS

International Search Report for International Application No. PCT/No. 2020/050247, dated Dec. 9, 2020.

(Continued)

*Primary Examiner* — Avia Salman

(74) *Attorney, Agent, or Firm* — Birch, Stewart, Kolasch & Birch, LLP

(57)　　　　　ABSTRACT

A method for establishing or facilitating a network connection between a client and an originating traceability application and between the originating traceability application and a first computer system as well as between the first computer system and the client in a network such that data from the originating traceability application and the first computer system may be federated.

14 Claims, 9 Drawing Sheets

Data_A = S/Track &Trace stored/managed data
Data_B = "Retailer/Vendor" stored/managed data Data_C = Data output generated by a function using Data_A and Data_B as input Data_C can be stored in both systems - Data_C managed by rules set up between the participating systems Function_C can be operated by both systems A and/or B operated and managed set up between the systems Overview 400: Unique serialized code generated of the code originating traceability application 601

73456KJGFSJYG

Director (500)

Function(s) C that use data from system A and B to generate data_C

Function_C

Data_C

601: System A

900: System B

601: Originating traceability application

900: First computer system

(58) Field of Classification Search

CPC ..... H04L 43/06; H04L 47/762; H04L 67/535; H04L 41/50; H04L 65/403; H04L 67/104; H04L 67/303; H04L 63/0823; Y10S 707/949; H04W 12/02; H04W 12/06; H04W 12/08; H04W 12/30; H04W 12/37; H04W 12/64; H04W 40/00; H04W 48/18; H04W 88/06; H04W 12/084; H04W 12/088; H04W 12/63; H04W 16/16; H04W 4/50; H04W 8/18

USPC .......................................................... 705/28

See application file for complete search history.

(56) References Cited

U.S. PATENT DOCUMENTS

| | | | |
|---|---|---|---|
| 8,996,610 B1 | 3/2015 | Sureshchandra et al. | |
| 9,794,321 B2 * | 10/2017 | Trifa ....................... H04L 67/02 | |
| 9,794,621 B2 | 10/2017 | Merlin | |
| 10,074,063 B2 | 9/2018 | Loeken et al. | |
| 10,607,169 B1 | 3/2020 | Carlisle et al. | |
| 11,418,490 B2 | 8/2022 | Shribman et al. | |
| 12,141,745 B2 * | 11/2024 | Løken ................. G06Q 10/087 | |
| 2005/0209947 A1 | 9/2005 | Shafer | |
| 2007/0185775 A1 * | 8/2007 | Lawton ............... G06Q 50/188 | |
| | | | 705/26.8 |
| 2008/0021767 A1 | 1/2008 | Benson et al. | |
| 2008/0148365 A1 | 6/2008 | Yoshida et al. | |
| 2011/0087733 A1 | 4/2011 | Shribman et al. | |
| 2012/0022944 A1 | 1/2012 | Volpi | |
| 2012/0181330 A1 | 7/2012 | Kim | |
| 2012/0265593 A1 | 10/2012 | Etheredge et al. | |
| 2012/0278242 A1 | 11/2012 | Griffith | |
| 2013/0006742 A1 | 1/2013 | Richard | |
| 2014/0006098 A1 | 1/2014 | Oliveira et al. | |
| 2014/0249942 A1 | 9/2014 | Hicks et al. | |
| 2014/0324627 A1 | 10/2014 | Haver et al. | |
| 2015/0102100 A1 | 4/2015 | Hattrup et al. | |
| 2015/0112784 A1 | 4/2015 | Lupoli et al. | |
| 2015/0154568 A1 | 6/2015 | Gu | |
| 2015/0220965 A1 | 8/2015 | Sullivan et al. | |

| | | | |
|---|---|---|---|
| 2015/0324831 A1 | 11/2015 | Barua et al. | |
| 2015/0363829 A1 | 12/2015 | Landers | |
| 2016/0132921 A1 | 5/2016 | Calvo Martinez et al. | |
| 2018/0025185 A1 | 1/2018 | Hattrup et al. | |
| 2018/0314745 A1 * | 11/2018 | Filippi .................. G06F 16/248 | |
| 2019/0050883 A1 | 2/2019 | Wedderburn | |
| 2019/0373084 A1 | 12/2019 | Reynolds et al. | |
| 2020/0226617 A1 | 7/2020 | Meadow | |
| 2021/0090011 A1 * | 3/2021 | Rae ....................... G06F 16/955 | |
| 2022/0247624 A1 | 8/2022 | Johnson et al. | |

FOREIGN PATENT DOCUMENTS

| | | | |
|---|---|---|---|
| WO | WO 2006/137633 A1 | 12/2006 | |
| WO | WO 2020/119955 A1 | 6/2020 | |

OTHER PUBLICATIONS

International Search Report for International Application No. PCT/No. 2024/050033, dated May 13, 2024.

International Search Report for International Application No. PCT/No. 2024/050034, dated Apr. 26, 2024.

Norwegian Search Report for Norwegian U.S. Appl. No. 20/191,203, dated Mar. 27, 2020, with an English translation.

Written Opinion of the International Searching Authority for International Application No. PCT/NO2020/050247, dated Dec. 9, 2020.

Written Opinion of the International Searching Authority for International Application No. PCT/NO2024/050033, dated May 13, 2024.

Written Opinion of the International Searching Authority for International Application No. PCT/NO2024/050034, dated Apr. 26, 2024.

International Preliminary Report on Patentability for International Application No. PCT/NO2024/050034, dated Mar. 10, 2025.

Written Opinion of the International Preliminary Examining Authority for International Application No. PCT/NO2024/050033, dated Feb. 4, 2025.

Written Opinion of the International Preliminary Examining Authority for International Application No. PCT/NO2024/050034, dated Jan. 16, 2025.

* cited by examiner

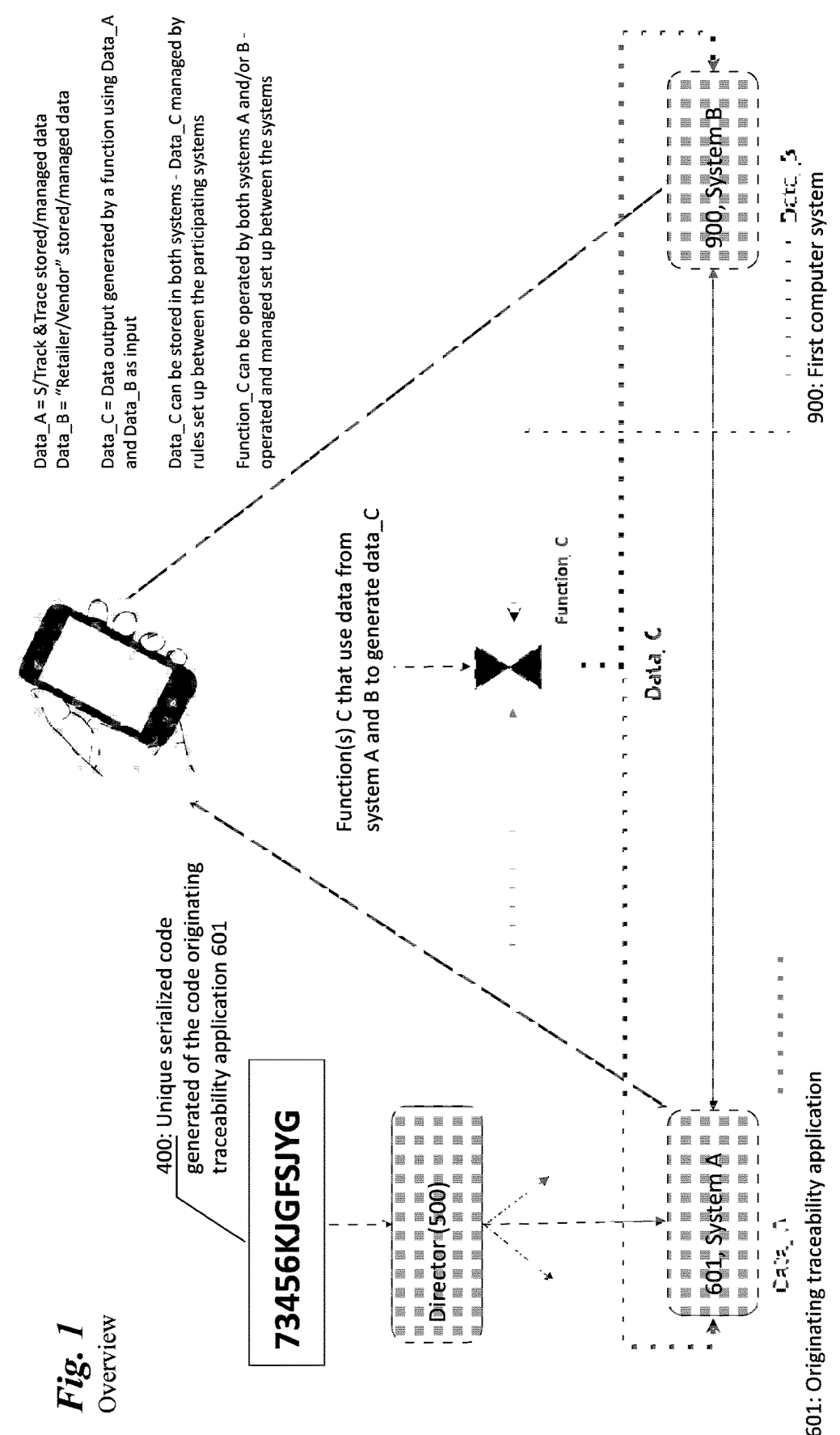

*Fig. 1*
Overview

Data_A = S/Track &Trace stored/managed data
Data_B = "Retailer/Vendor" stored/managed data Data_C = Data output generated by a function using Data_A and Data_B as input Data_C can be stored in both systems - Data_C managed by rules set up between the participating systems Function_C can be operated by both systems A and/or B - operated and managed set up between the systems Function(s) C that use data from system A and B to generate data_C Function_C Data_C 900, System_B Data_B 900: First computer system 400: Unique serialized code generated of the code originating traceability application 601

73456KJGFSJYG

Director(500)

601, System_A

Data_A

601: Originating traceability application

Redirector System query one by one

Redirector System facilitate connection

Redirector System all queried at
the same time.

Fig. 6

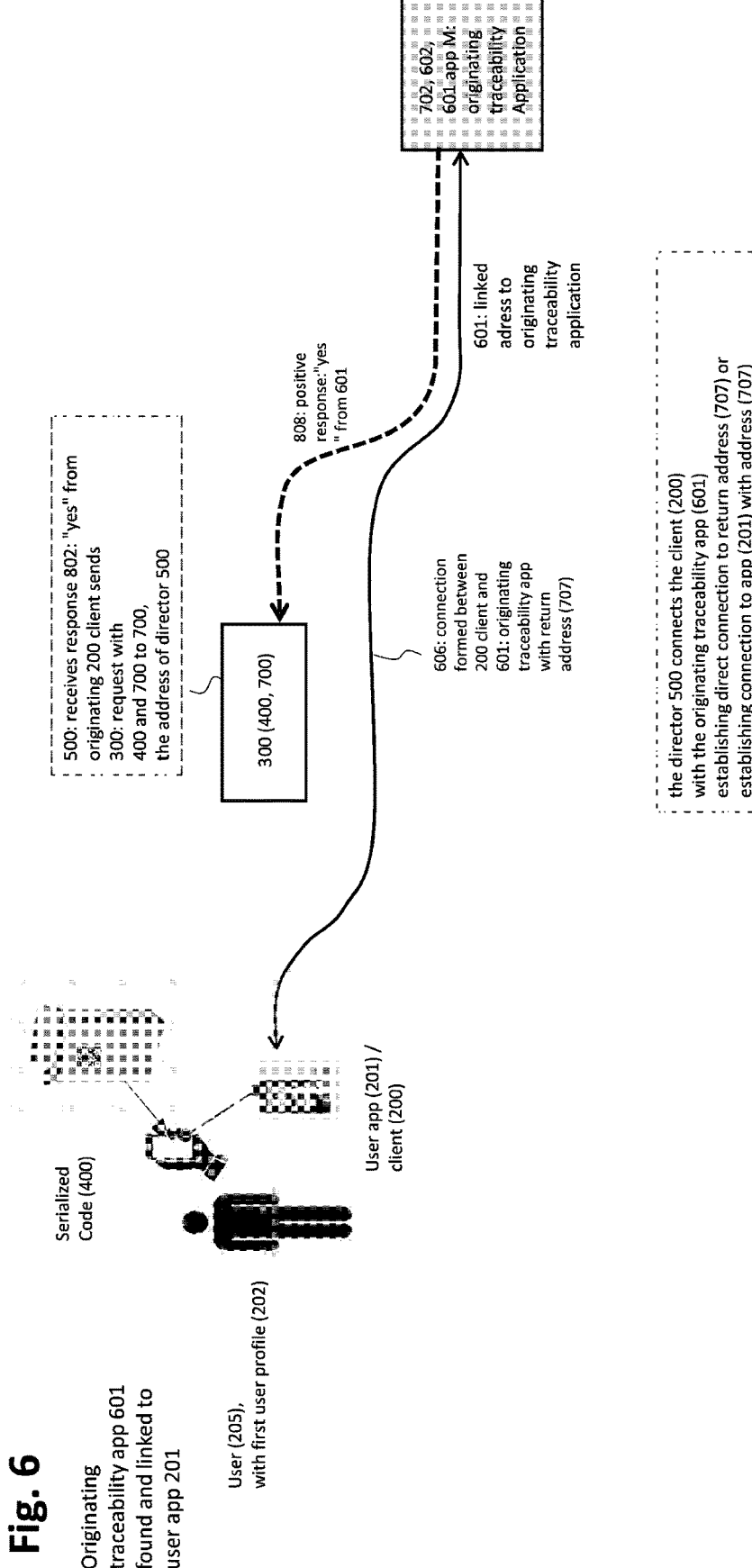

Originating traceability app 601 found and linked to user app 201

Serialized Code (400)

User (205), with first user profile (202)

User app (201) / client (200)

702, 602, 601 app M: originating traceability Application

601: linked adress to originating traceability application

808: positive response:"yes " from 601

500: receives response 802: "yes" from originating 200 client sends 300: request with 400 and 700 to 700, the address of director 500

300 (400, 700)

606: connection formed between 200 client and 601: originating traceability app with return address (707)

the director 500 connects the client (200) with the originating traceability app (601) establishing direct connection to return address (707) or establishing connection to app (201) with address (707) via the director 500

Establishing connection to the first
computer system

Exchanging data between track and trace system 601 and vendor system 900 and evoking functions upon the data In an embodiment of the invention the first computer system (900) interacts with said user (201) via said user client (200) about data C related to said serialized code (400): user interacts virtually only with the first computer system (900).

METHOD FOR ESTABLISHING NETWORK CONNECTIONS BETWEEN A CLIENT, AN ORIGINATING TRACEABILITY APPLICATION AND A FIRST COMPUTER SYSTEM IN A NETWORK AND EVOKING FUNCTIONS ON DATA FROM BOTH SYSTEMS

BACKGROUND OF THE INVENTION

Serialization of product items and traceability has become increasingly widespread in recent years. A uniquely identifiable product code on an item is recognized by a computer implemented traceability system in "the cloud", and a response is returned from the traceability system to a user with information about the product item. As the demand for traceability and serialization increases, more and more traceability systems have been implemented.

Traceability applications are part of computer systems that create and manage serialized codes that can also be aggregated and used in a track and trace system. Traceability applications are here to be understood as systems having capabilities and functions as explained herein.

For accumulating information about a product item, and later access it via a computer communication network such as in the cloud on the Internet, a product item is marked with at least a unique identifier (uid) and usually an Uniform Resource Identifier (URI) or a Universal Resource Locator (URL). A problem with this information when labelling it on the product is that this type of specific information can be quite extensive in terms of length of text and numbers and symbology that needs to be marked on the product item due to large series of otherwise identical products and a long, detailed specific target URL to address among many other different product targets, and the available space for marking may be very limited.

Further it is desireable to be able to access user data from a computer system that belongs to the producer/retailer/brand of the product item along with information that is stored in the track and trace system in order to be able to generate functionality based on information that is exclusive to either system, but when combined, together generates further value. Such information can be related to discount and warranty structures in order to keep track of such functions without any manual operations where the information is easily accessible by scanning the QR-code of the item in question. An example can be the case where a user has purchased a product from a vendor that offers additional warranty in addition to the standard product warranty, where this information is saved in the user profile in the retailers system while the manufacturer that is responsible for ensuring that the correct warranty is enforced will be able to update this information in their track and trace system based on a linking between the two systems. The method can also be used in order to grant discounts wherein information on previously bought items is stored in the user profile's consumer history in the vendor system, and information on the present purchase is provided by the track and trace system.

The background art has several problems in various related technical fields.

Marking Speed

A particular problem is that printing or marking QR-codes (or electronic tags of any kind, RFID, NFC, etc) on a production line is relatively time consuming. The more information that is carried by a QR-code the longer time it will take to print it.

Effectively this will slow down production speed since today the printing speeds of QR-codes or any type of two-dimensional barcode are generally not keeping up with production lines speeds—at least not for an acceptable cost. It is therefore important to reduce the information in the QR-code to a minimum, including the address to the processing resource.

Ideally the code mark should be kept very short or small. Please notice that the unique identifier (uid) is really unique in all practical considerations. Another issue, typically for a provider of such traceability systems with several customers, is to direct a myriad of different products to the right instance or system, i.e. the traceability application where the serialized code was created and originated. A resource address as used in the background art should be complete in order to lead to the properly associated application in the traceability system.

Another situation arises wherein several de-facto independent traceability system vendors need to mutually interact in order to establish an inter company or inter system industry tracing system in order to scale up interoperability. This interaction is required when a party is adding and (or retrieving) information or tracking event(s) about the serialized product item and thus the information about the new event is reflected in the traceability application. Such adding or retrieving of information events may occur during packaging of marked product items, re-packaging of marked product items, border controls, unpackaging of multi-packaged product items, and sale of product items to a supposed end user, or in transfer from one user to another user.

In a supply chain with a considerable number of companies, participants and stakeholders, and all with varying levels of capabilities and resources, that need to either add tracing events related to a serialized code on the product item to, or sometimes retrieve tracing data related to the serialized code from, another yet high number of independent traceability applications, a one-to-one integration is just not feasible.

A unique, serialized code of an initially "unknown" product item, wherein the code may be encrypted, is easily routed to an appropriate system among a large number of initially unknown originating traceability system among many potential traceabilty systems, for any initially unknown party, is easily achieved with the current invention.

The present invention thus enables a party or any supply chain stakeholder—that does not initially know or have relations with the unique serialized code product item owner, or the originating traceability application, to easily add basically an ad-hoc event, such as re-packaging of containers, customs checking, multi-box unpackaging, product information aquisition by a potential buyer, purchase in the shop to an end user, or the end user conducting owner registration, all events related to the serialized code, when so required. The serial code here can represent not only a product item—but any object associated with a serialized code utilized in a track and trace context such as a serialized code marked packaging box for a contained serialized product item, a serialized marked box container, or a serialized code marked shipping container. This enables and facilitates an extremely efficient "all to everyone" scalable and "incognito" interaction between seemingly "unknown" parties when using a serialized code. The invention solves this problem since if a stakeholder (a user) wishes to add an event (or retrieve data) related to the serialized code, this user in all situations, in a system according to the invention, simply forwards such a request to a single resource location applicable for all serialized codes and applicable to all users and stakeholders within the industry, thus the director of the present invention will link the serialized code (uid) with the resulting correctly traceability associated application without the users need for any knowledge about the serialized code (and thus product) and the originating traceability application in the system wherein the event is correctly added and managed. Further rules, protocols, parameters and criteria that might be enforced for such interactions, such as for instance authorization and authentications, is not a scope of this invention.

The present invention is thus related to serialized product items being marked efficiently, carrying a brief initial uniform resource identifier (URI) and in such a way that based on the serialized code, it is easy to establish and facilitate the interaction between stakeholders application in a supply chain and the appropriate originating traceability application.

U.S. Pat. No. 9,794,321 Trifa et al. relates to a computing system, and a redirector with a rules database, configured to receive an object identifier and contextual information from a client application. Based on that object identifier and the rules database and the contextual information that is analysed against a predefined set of rules, the redirector maps the object identifier and the contextual information to a deduced entry point associated with a specific computer application among a plurality of applications. Then access is provided to said specific computer application to the client application and user.

That background art employs a rules database in front of the plurality of applications whereby applying the rules on the contextual information will determine which application shall receive the request, and how to respond, based on the same contextual information. In the present invention, each queried traceability application may itself decide whether it is the originating (or managing) traceability application of the unique identifier queried about.

In comparison with this background art, the current invention does not use any such rules database or analysing logical capability in front of the plurality of applications to determine which application shall process the request or indicate to the applications how to respond.

Traceability systems of the background art involve a large number of different complex configurations and rule sets that are difficult to generate and then later difficult and demanding to maintain in a redirector rules database. To keep the rules and a redirector database up to date at all times can be a labour and resource intensive task. This maintenance of rules is especially labor demanding when it comes to incorporating all different and fast growing number of user profiles using a client whose context must be mirrored in the rules database in order that the redirector works properly and as intended. In other words, the difficulty and complexity arises partly from changes being made in one or more of the potential traceability applications, and partly from dynamic contextual information from predominantly users and user profiles that change and grow in volume every day and that needs to be updated in the rules database for ensuring the right redirector redirects to the appropriate address of the application, as well as providing the correct contextual information to the traceability applications to provide a response.

The present invention solves one or more of the above mentioned problems.

SUMMARY OF THE INVENTION

The invention is defined in the present independent claim. The invention provides a method for establishing or facilitating a network connection (606) between a client (200) and an originating traceability application (601) and between said originating traceability application (601) and a first computer system (900 in a network (101) and combining data (650, 950) between said originating traceability application (601) and a first computer system (900), said method comprises:

providing a list (550) of a plurality of resolvable network addresses (702) of a plurality of corresponding traceability applications (600, 602, 601);

providing a plurality of serialized product items (401), each associated with a unique identifier (400), each said unique identifier (400) originated or managed by an associated originating traceability application (601) within said plurality of said traceability applications (600), all said serialized product items (401) associated with a network address (700) resolvable for a network director (500), a) a client (200) reads said unique identifier (400) and said network address (700) to said network director (500), and sends a first request (300) comprising said unique identifier (400), to said network director (500), b) said network director (500) sends a second request (302, 301) comprising said unique identifier (400) to one or more of said network addresses (702) of said corresponding traceability applications (602, 601), for the purpose of receiving a response (800) whether said traceability application (602, 601) recognizes said unique identifier (400) as originated by said traceability application (602, 601) now recognized as said originating traceability application (601), c) if said response (800, 808) to said second request (301), is a positive or affirmative response (808), then d) said network director (500) establishes a connection (606) between said requesting client (200) and said originating traceability application (601); wherein e) said affirmative responding traceability application (601) establishes a connection (606) to a first computer system (900);

f) said first computer system (900) establishes a connection to the client (200);

g) said originating traceability application (601) and said first computer system (900) exchange a first and/or a second set of data (650, 950), h) said first and/or second set of data (650, 950) being processed by a function (960) thereby generating a third set of data (961).

Embodiments of the invention are described below and rendered in the dependent claims.

BRIEF FIGURE CAPTIONS

Embodiments of the invention are illustrated in the attached drawing Figures, wherein FIG. 1 illustrates an embodiment of the invention wherein a unique identifier (400) from a product item (401) is forwarded to a director (500). Said director (500) obtains a positive response thus reaches the originating traceability application (601) within a network of traceability applications (600). The originating traceability application (601) further sets up a connection to a "retailer/vendor" computer system (900) with a first user profile (910), wherein data (650, 950) related to the user (205) associated with the product item in both systems (601, 900) is federated and functions are evoked upon the data (650, 950) from both systems (601, 900) in order to gain functionality not accessible in either system (601, 900) separately.

FIG. 2 illustrates an embodiment of a part of the invention wherein one of a plurality of serialized product items (401) each are provided with a unique identifier (400). The unique identifier (400) is read into a client (200) which sends a request to a director (500) in order to reach an originating traceability application (601) which originated the unique identifier (400). The director (500) forwards a request with the unique identifier (400) to one of a number of N traceability applications (602) (of which addresses are held on a list (550) readable by the director (500). The director sends the request (302, 301) one at a time, of which one of them may be the originating traceability application (602, 601), asking whether the receiving traceability application (602) is an originating traceability application (601). If no response is received within reasonable time, or if a negative response (802) is received, the director may query (302) the next on the list. The one originating traceability application (602, 601) which receives the recognized request (301) is the originating traceability application (601), here denoted number M, returns a positive response (808) to the director (500), which halts its querying, and the director (500) facilitates a connection (606) between the client (200) and the originating traceability application. Further traceability applications beyond number M are not queried.

FIG. 3 illustrates that the director (500) facilitates the connection (606) between the client (200) and the found originating traceability application (601).

FIG. 4 illustrates another embodiment a part of the invention similar to the one in FIG. 1, with the difference that the director (500) forwards a request with the unique identifier (400) to all of a number of N traceability applications (602) at the same time. The director sends the request (302, 301) all at the same time, their addresses are held on the list (550) readable by the director (500). The one originating traceability application (602, 601) which receives the recognized request (301) is the originating traceability application (601), here denoted number M, returns a positive response (808) to the director (500), and the director (500) facilitates a connection (606) between the client (200) and the originating traceability application (601). Those not being the originating traceability application need not reply, and may be instructed to do so instead of returning a negative response (802). This saves time, but if the number of potential traceability applications (602, 601) is large, such a query may generate much unnecessary traffic.

FIG. 5-FIG. 9 illustrate an embodiment of the invention as a step by step illustration. FIG. 5 shows the first step where a user with a user app (201) on a client (200) scans an unique identifier (400) on a product item (401). Please refer to FIG. 2 for a detailed description of the procedure. Eventually, the unique identifier (400) originating traceability application (601) responds to the director (500).

FIG. 6. illustrates the forming of a connection between user app (201) and the originating traceability application (601) as described in FIG. 3.

Figure 2:
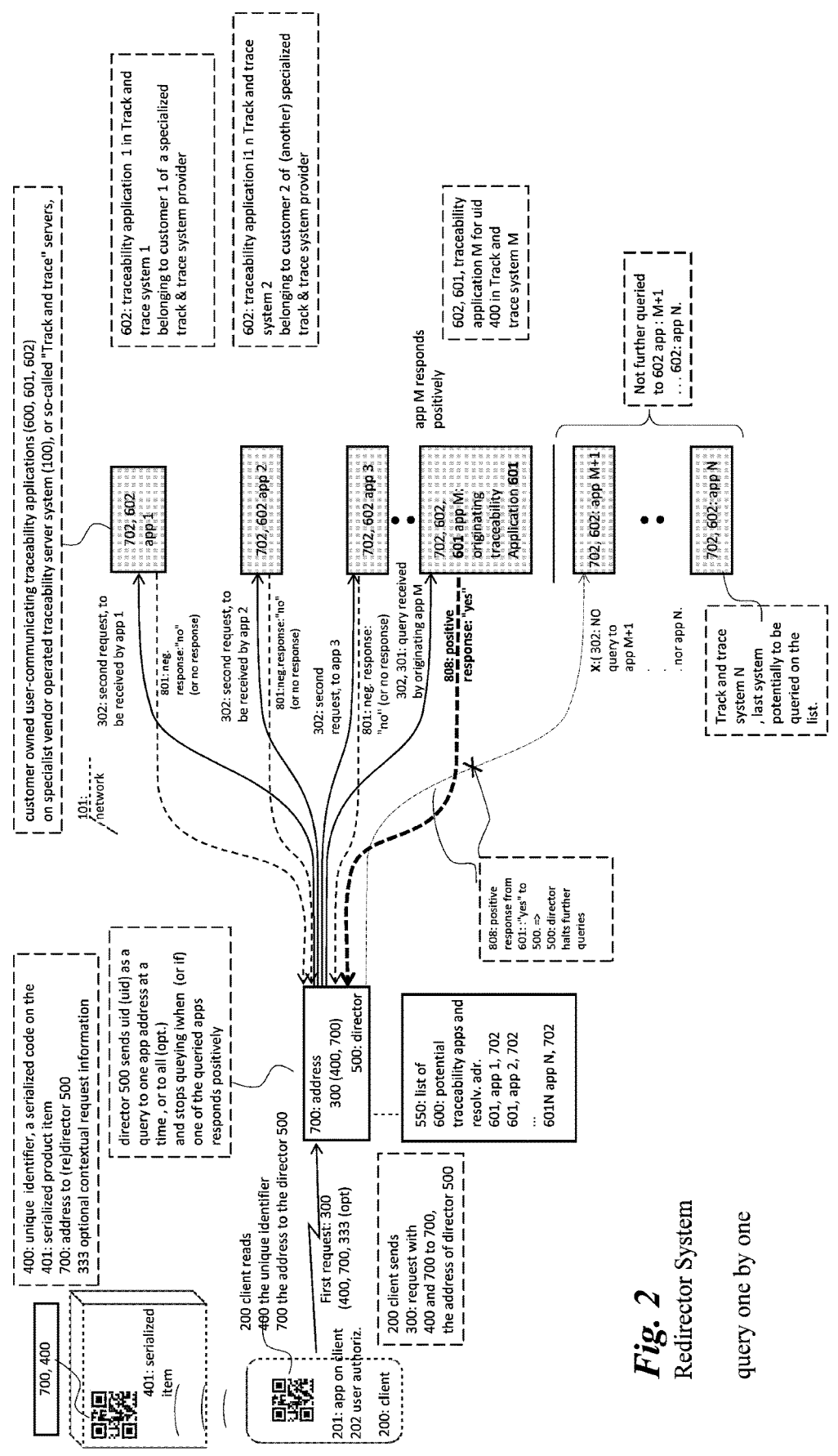
Figure 3:
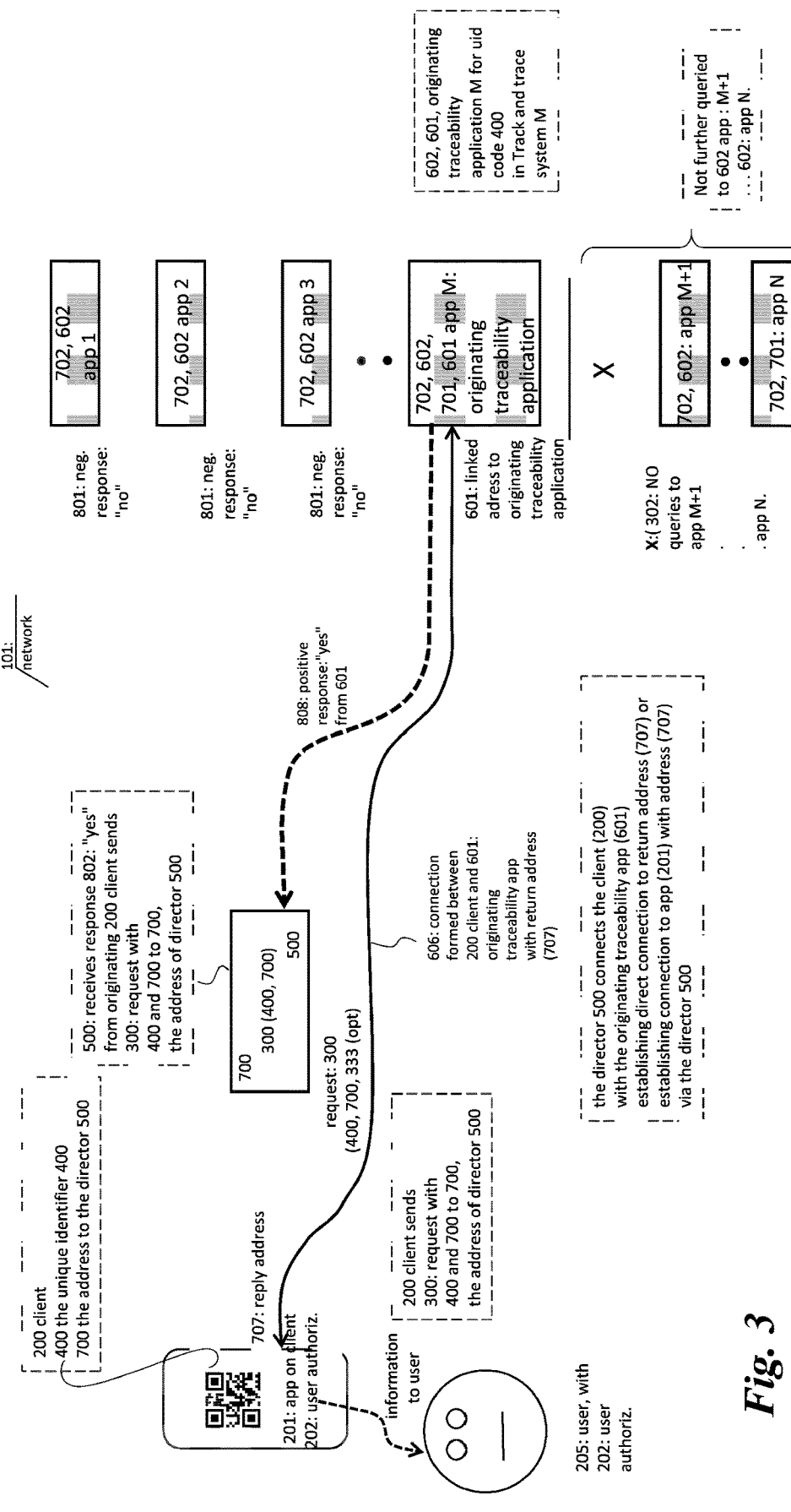
Figure 4:
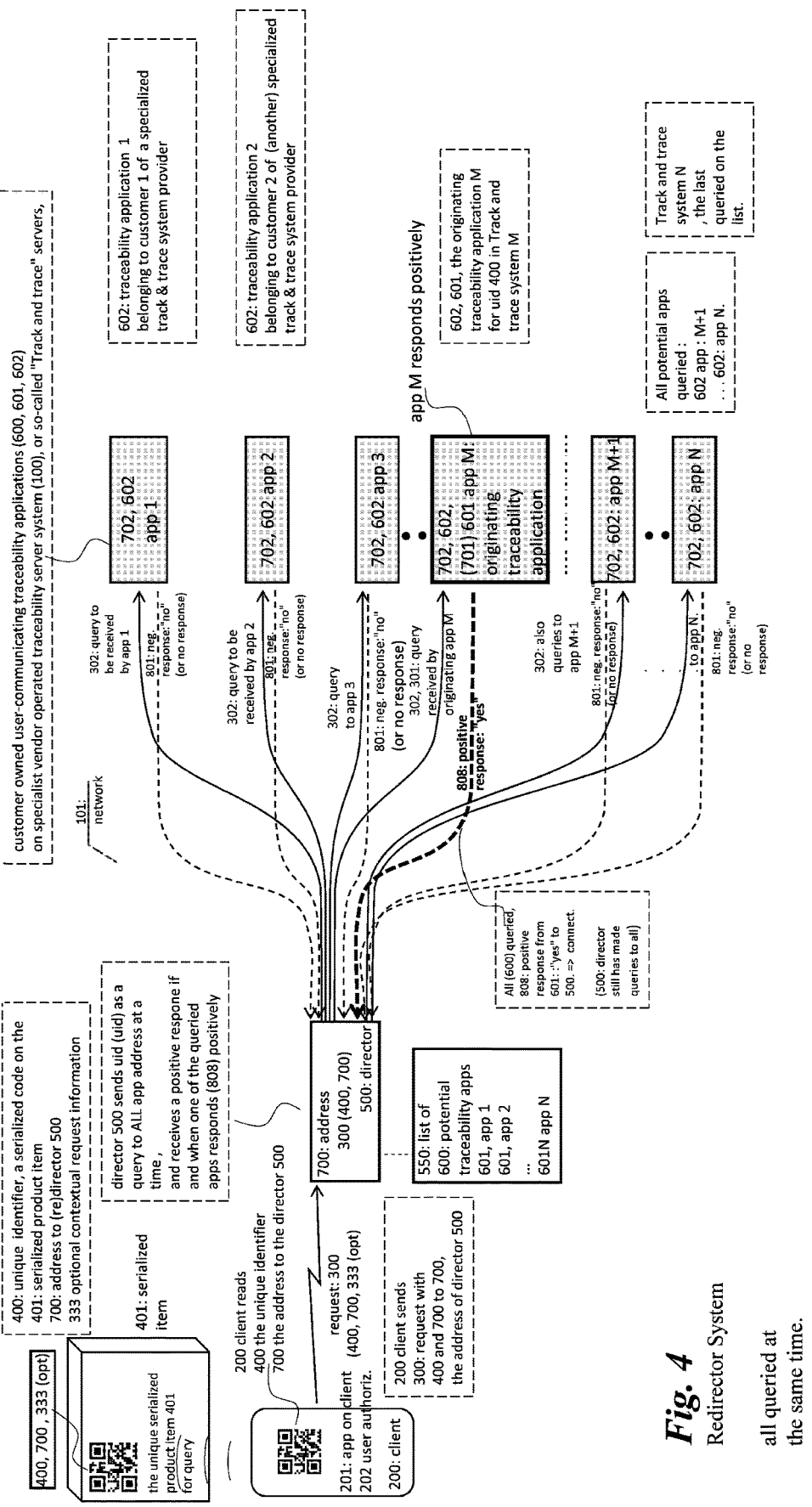
Figure 5:
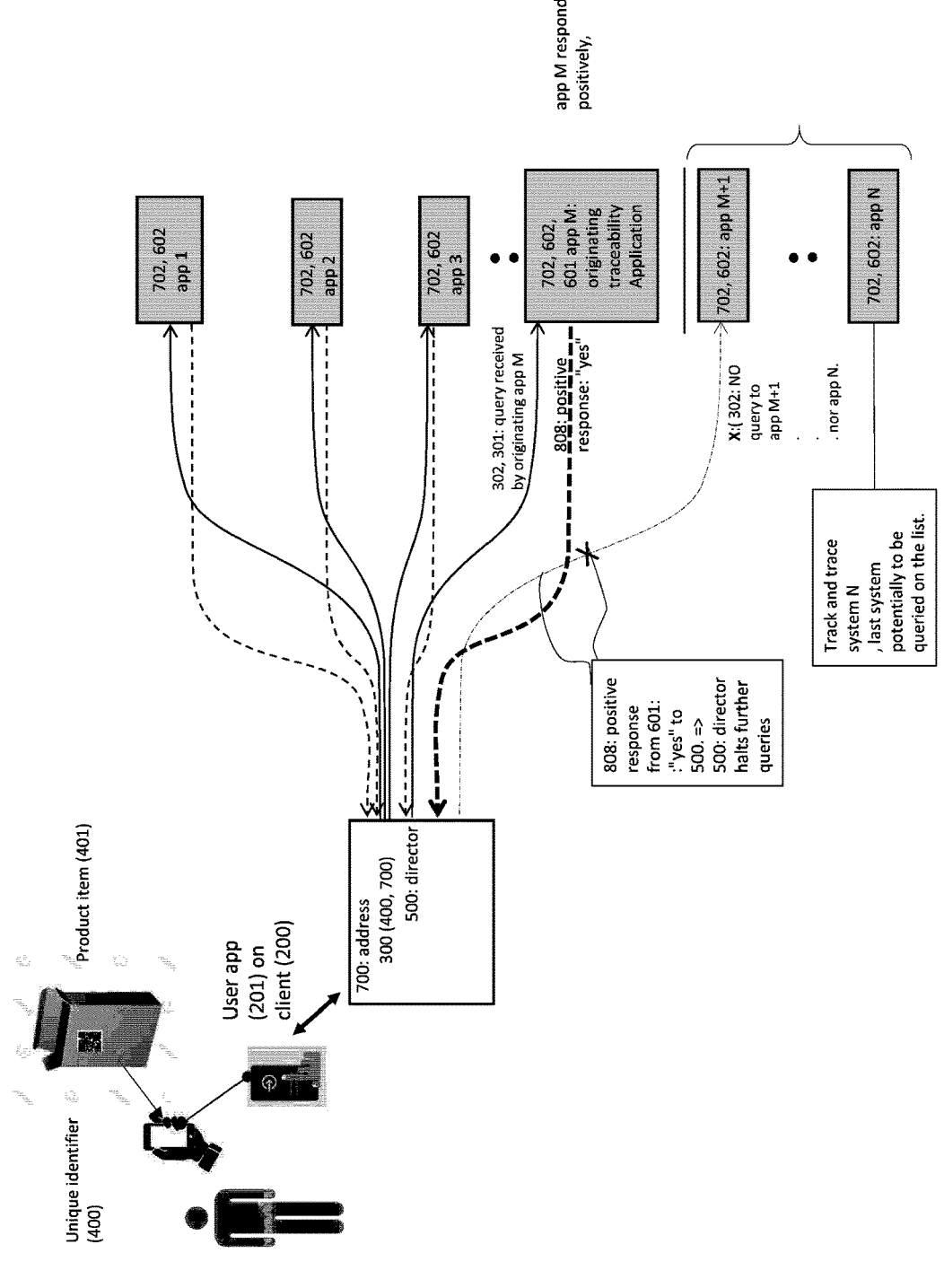
Figure 7:
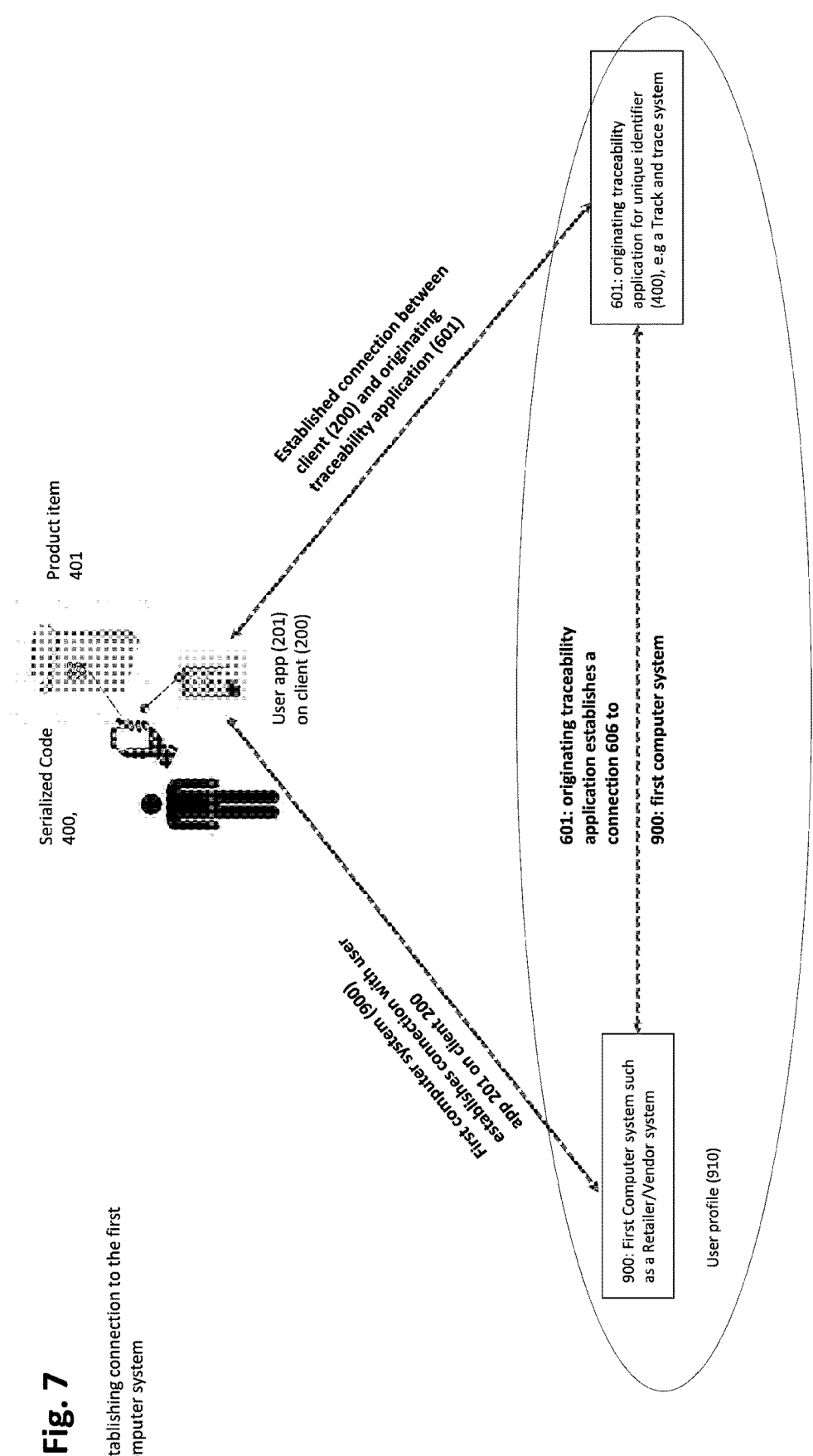
FIG. 7 illustrates the establishment of a connection (606) between the originating traceability application (601) and a first computer system (900) wherein the user has a user profile (910), as well as a connection (606) between the first computer system (900) and the client (200).
Figure 8:
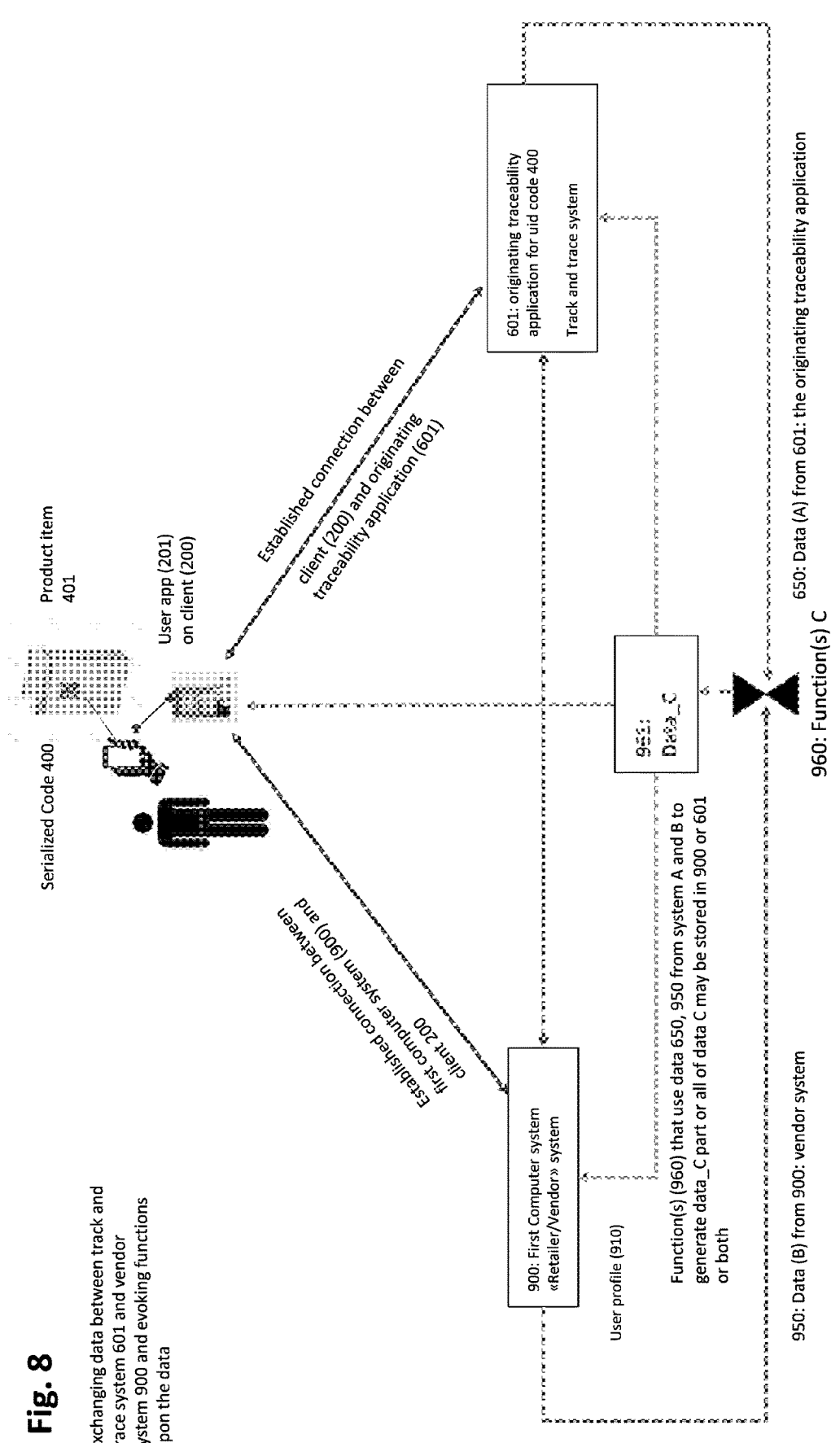
FIG. 8 illustrates the federation of data from user profile (910) in the first computer system (900) and the originating traceability application (601), wherein functions (960) are evoked on the data (650, 950) from both systems further generating data C (961) that can be used internally or stored in either system (601, 900) or transmitted to user app (201).
Figure 9:
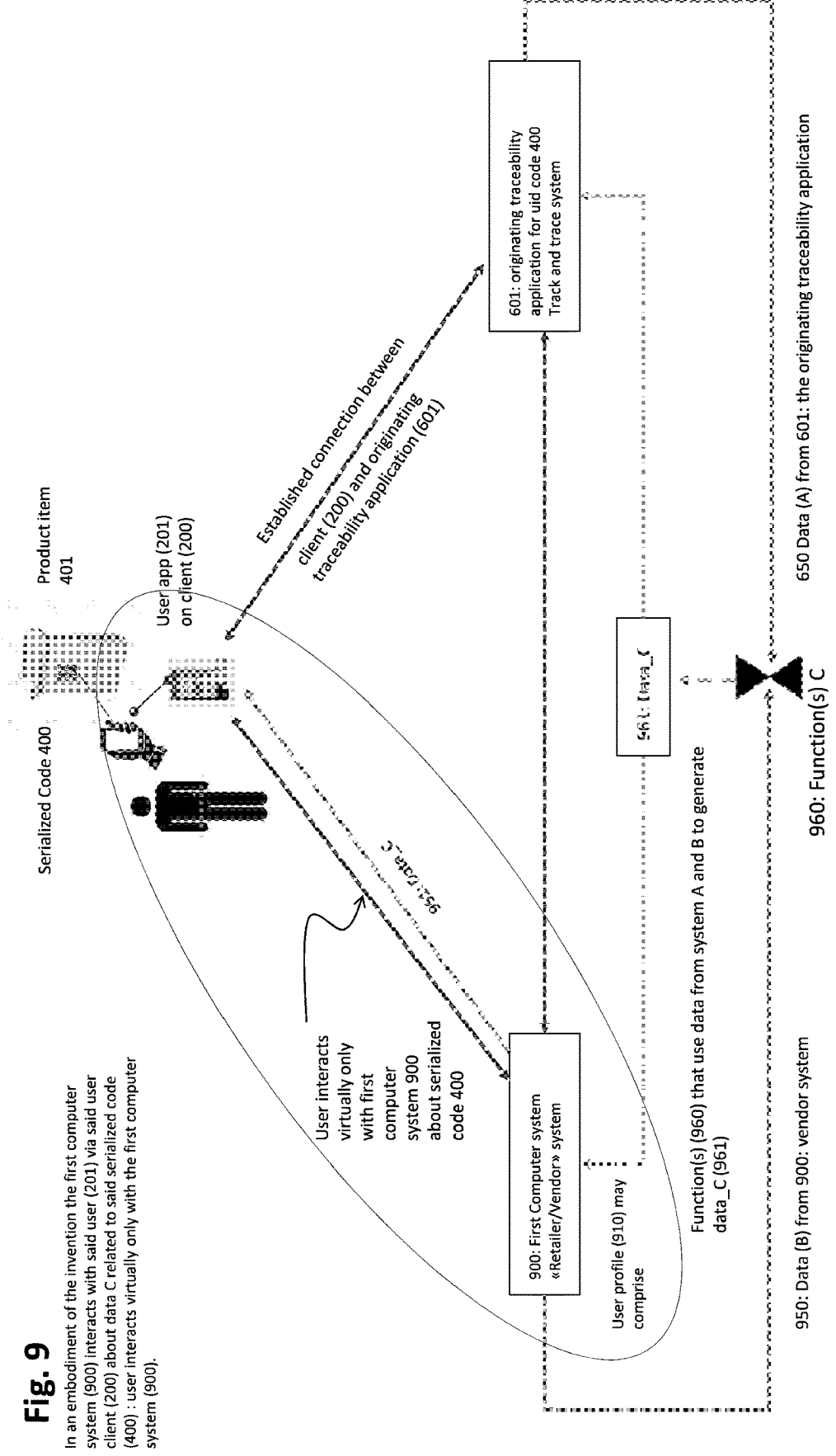

FIG. 9 illustrates an embodiment of the invention illustrated in FIG. 8, wherein data C (961) is stored in the first computer system (900) and therefrom used in communication with the user via user app (201). An example of the interaction depicted in FIG. 9 is that a consumer is buying a new product item (401) etc, a fourth similar item to the previous three items, thereby evoking a discount automatically. The originating traceability application (601) registers the purchase and the purchase information combined with previous purchase information and discount structure is used with a function C (960) to generate a discount (data_C) (961) which is stored in the first computer system (900) and transmitted to the user app (201) on client (200).

EMBODIMENTS OF THE INVENTION

The method and system according to the current invention utilises a similar but improved method compared to the background art US '321 Trifa patent, but in a faster, simpler, more accurate and less resource demanding way, and further utilizes data from the unique identifier. One of the most prominent and significant differences is that the method and system of the invention does not employ the context aware redirector nor the rules database as described in US '321 Trifa, and the task of keeping such a rules database up to date is thus eliminated.

The invention provides a method for establishing or facilitating a network connection (606) between a client (200) and an originating traceability application (601) and between said originating traceability application (601) and a first computer system (900) as well as between said first computer system (900) and said client (200) in a network (101) and combining data (650, 950) from said originating traceability application (601) and a first computer system (900), said method comprises:

providing a list (550) of a plurality of resolvable network addresses (702) of a plurality of corresponding traceability applications (600, 602, 601);

providing a plurality of serialized product items (401), each associated with a unique identifier (400), each said unique identifier (400) originated or managed by an associated originating traceability application (601) within said plurality of said traceability applications (600), all said serialized product items (401) associated with a network address (700) resolvable for a network director (500), a) a client (200) reads said unique identifier (400) and said network address (700) to said network director (500), and sends a first request (300) comprising said unique identifier (400), to said network director (500), b) said network director (500) sends a second request (302, 301) comprising said unique identifier (400) to one or more of said network addresses (702) of said corresponding traceability applications (602, 601), for the purpose of receiving a response (800) whether said traceability application (602, 601) recognizes said unique identifier (400) as originated by said traceability application (602, 601) now recognized as said originating traceability application (601), c) if said response (800, 808) to said second request (301), is a positive or affirmative response (808), then d) said network director (500) establishes a connection (606) between said requesting client (200) and said originating traceability application (601); wherein e) said affirmative responding traceability application (601) establishes a connection (606) to a first computer system (900);

f) said first computer system (900) establishes a connection to the client (200);

g) said originating traceability application (601) and said first computer system (900) exchange a first and/or a second set of data (650, 950), h) said first and/or second set of data (650, 950) being processed by a function (960) thereby generating a third set of data (961).

Information on how to establish the connection (606) from said originating traceability app (601) to said first computer system (900) may be related to the product item (401) and reside in said traceability app (601) which also may provide information about the user client (200) for which the first computer system (900) may connect.

As an example, the first set of data (650) read from said originating traceability application (601) may comprise specific properties of said product item (401) which requires a certain age for the user to buy. But the originating traceability application (601) is e.g. a track and trace application which does not hold such information on the user's age. However, said second data (950) may comprise information in a user profile on the user's age, the nationality of the user, etc. connected to a user profile (910). The information on product properties from the first set of data (650) combined with the user's age from the second set of data (950), and combined with local regulations on age restrictions on such products, may be combined to form a decision whether the user may continue with buying the product item (401).

In an embodiment of the present invention said function (960) originates in either the first computer system (900) or the originating traceability application (601).

In an embodiment of the present invention if said response (800, 801) is negative ("no") (801), disregard said response (800, 801); In an embodiment of the present invention each traceability application (602, 601) receiving said second request (302) will itself analyze said unique identifier (400) to determine whether it can resolve said unique identifier (400) thereby identifying as an originating application (601) of said unique identifier (400), or reject/ disregard said second request (302).

In an embodiment of the invention, said director (500) is arranged to send said second request (302, 301) to one by one of each traceability application (602, 601) in said list (550); until said response (800, 801, 808) is a positive response (808).

In and embodiment, if receiving a positive response, then not sending further requests (302) to further traceability applications (602) in said list (550).

Often such unique identifiers (400) are encrypted and the decryption takes place at the originating traceability application (601) in order for it to look up the second request (302, 301) based on the internally decrypted unique identifier (400) in order to determine whether the second request (302, 301) is a properly resolvable request (301) with an originated unique identifier (400) which shall result in an affirmative response (808). Those traceability applications (602) which are not originating traceability applications will normally not be able to even decrypt the second request (302) and shall return a negative response (801) or no response.

A first advantage of this embodiment is that the time and total work involved for sending further second requests (302) is saved when a positive or affirmative response (808) is received. The number of potential traceability applications in said list (550) may be considerable and can be in the hundreds or the thousands.

A second further advantage of this embodiment is that it is less energy consuming for the network (101) because no signals or processing energy is required for further queries when said positive or affirmative response (808) is received.

A third further advantage of this embodiment is that it reduces the traffic on said network (101) compared to querying all potential traceability applications (602) on said list (550).

A fourth further advantage of this embodiment is that it does not evoke any energy for internal tracing to provide negative response (802) from those traceability applications (602) not queried, nor any return traffic from such not queried on said network (101).

In an embodiment of the present invention said second request (302, 301) to said application (602) includes contextual information (333), said contextual information (333) comprises an instruction (333, 334) to not return a negative response (801) in case said traceability application (602) is not an originating traceability application (601) of said unique identifier (400).

In an embodiment of the invention said director (500) is arranged to send said second request (302, 301) simultaneously to all traceability applications (602, 601) in said list (550).

An advantage of this embodiment is that it is fast to find the originating traceability application (601), however at a cost of increased traffic for querying an otherwise unnecessary number of potential candidates on the list (550).

In an embodiment of the invention, if an affirmative "yes" response (808) has not been received when said list (550) of traceability systems (600) is exhausted, then return a response (800, 820) stating that a unique identifier (400) originating traceability application (601) is not found, as response (820) to said client (200).

In an embodiment of the invention, including in said second request (302, 301) to said application (602) contextual information (333) comprising an instruction (333, 334) to not return any response (800) if it otherwise would return a negative response (801) in case said queried traceability application (602) is not an originating traceability application (601) of said unique identifier (400).

An advantage of this embodiment is that only the positively responding traceability application (601) returns any response (808), the remaining requested (otherwise negatively responding) traceability applications (602) remain silent about their received second request (302).

In an embodiment of the invention, said method managing unique identifiers (400) and aggregated track and trace information based on said unique identifier (400), whereby said traceability application (602, 601) conducts the steps of:

a) receive contextual information (333) pertinent and applicable to said second request (302, 301) itself together with said unique identifier (400);

b) compose a response (800, 808) according to and based on internal rules and instructions associated with said unique identifier (400) and/or said received contextual information (301, 333).

For simplicity this specification uses the term 'product item', and then a serialized product item (401) which is associated with a unique identifier (400). However, a physical object or object/systems with means to store a serialized code, a unique identifier (400) with electronic means, is encompassed by the term serialized product item (401), the object associated with the unique identifier (400), such as the product item itself, all logistical containers or transportation devices, tags, labels, packaging, pallets, boxes, RFID, computers, hard discs. All material objects and media that carry a unique serialized code, a unique identifier (400) are included by the term 'serialized product item (401). Essentially, if the first request (300) includes a uniquely serialized code, i.e. a unique identifier (400), the unique serialized code, the unique identifier (400) may also be a unique identifier (400) at a hierarchical level of identifiers (400) forming part of an aggregated packaging tree for general track and trace purposes as described, inter alia, by the applicant in U.S. Pat. Nos. 8,423,770, 8,700,501 and 10,074,063. Central to the present invention is how to manage the unique serialized code (400) itself and to a lesser extent what it materially represents, since the material and hierarchical representation is managed by the target traceability application.

Significantly, the determination of the correct/originating traceability application to be connected to is carried out based on the unique identifier uid and by the properly responding applications among the several traceability applications. (Even other applications not originally intended to respond may in rare occasions be evoked).

This means that even copies or clones of the traceability application or applications adapted to respond to the unique serialized code from other systems than the originating application can further process the transaction.

The resource address read from the serialized item (401) described in the invention is partial in the sense that it is incomplete as such and will lead to the intended proper application when using the method of the invention.

Objectives of the Invention

One objective of the present invention is to provide a system (100) and a method to reliably connect a client (200) carrying the unique identifier (400) of a serialized product item (401) to an appropriate target traceability application (601) at a customer/manufacturer associated track and trace server.

More specifically, an objective of the present invention is to provide a method for establishing or facilitating a network connection (606) between a client (200) and an originating traceability application (601) and between said originating traceability application (601) and a first computer system (900) as well as between said first computer system (900) and said client (200) in a network (101) and combining data (650, 950) from said originating traceability application (601) and a first computer system (900), More specifically, an objective of the present invention is to provide a method for evoking functions (960) upon the data (950) from said first computer system (900) and data (650) from the originating traceability application in order to create data (961) that could not be obtained from one of the sources of data (650, 950) alone.

Another objective of the present invention is to provide this connection (606) between the user (205)/client (200) to its intended system traceability application (601), without the disadvantages related to the rules database of the background art and the database maintenance related thereto. Tracing of product items using serialization and aggregation are operated for various clients by expert vendors of traceability systems. The software and technology implemented for each customer is often based on the same core solution but has then has configurations, special developments and adjustments specific to each different customer and their customer system. Another common practice is that each customer has their own tracing system running instance operated on their behalf by the traceability vendor or provider. There are mainly two reasons for this; all the data are kept private and securely for the customer since there is no sharing of resources with other customers (nor other traceability system expert vendors) in any way with other customers that the traceability system expert vendor is operating tracing systems for, on their behalf. Further, the traceability system can be managed without the need of the expert vendor/customers having to wait for common developments of the software by the expert vendor to be distributed for all customers. It also makes operations less complex and efficient for the expert vendor.

In relation to the present invention, a client (200) is a piece of hardware and/or computer software that is capable of processing computer instructions and computer code and also able to communicate through computer (-enabled) networks and thus connect and communicate with other clients, software and computers. The client (200) device is typically a mobile unit such as a mobile telephone or a tablet. These preferably comprise a device to read a tag, such as a camera to read a barcode, a OR code or other optically encoded data, or means for reading data from RFID tags.

As an example the client (200) may be a smartphone with an app (201) or any other suitable computer system to interact with a user and communicate. As a further example the client (200) communicates one or more scanned serialized codes (400) from a serialised product item (401) to a track and trace system (601) of a customer system (100) run on a server at a specialist vendor, and exchanges information based on the serialized code (400).

A user (205) is a person that can interact with such a client (200) to take advantage of the client's (200) capabilities to perform and operate tasks and functions available by the client (200) and its system (100) associated app (201). When a user interacts with a client (200), that interaction is also sometimes referred to as "the user experience".

A user profile (202) is understood to be an authorization to interact with the client (200) and specific and uniquely identifiable information related to the user that will govern the interaction with the client (200). Such user profile (202) information is very commonly comprising; user name, address, user email, mobile phone number, and user id assigned within the client (200), selected user preferences within the client (200), etc. In an embodiment this user profile (202) is stored in said first computer system (900).

Within the field of product tracing, aggregated track-and-trace, a serialized code, hereafter referred to as a unique identifier (uid) (200) is associated with the product item (401). Nowadays the serialized code, the unique identifier (uid) (400) is printed as a QR-code or a Data Matrix code since these technologies have the required data storage capabilities. However an RFID, Near Field Communication (NFC) or any suitable data carrier solution for a product item (401) might be used to carry the unique identifier (uid) (400) within the frame of the current invention. Further the product item (401), in addition to the unique identifier (uid) (401), has additional important information associated with the product item (401). One such crucial information element is information or instructions regarding how to locate and access the system (100) that shall handle a processing request (300) from the user's client (200)—a request (300) that may involve the unique identifier (uid) (400). This information is typically held in a source related to a web address on the Internet (network) in the format "tracingsystem.com/<datasets N . . . M>", where the other associated information and datasets N . . . M on the product may be resolved or parsed and used in the subsequent processing. The techniques for parsing, deciphering, analysing or by some means or methods interpreting these datasets from the incoming request (300) is considered as belonging to the common background knowledge of the person skilled in the art.

Flexible Generic Address

Ideally the resource address (700) on the product item (401) shall be as generic as possible so that the actual location is flexible and it is possible to change it in situations where this will optimise the system (100) operations. Ideally one traceability vendor could have one single address (700) for all products in the market for all their customers such as "oneadr.com". In some cases also the same product item (401) might, and with the same generic (initial) resource address, eventually end up with different processing resources. Consider the following example to explain this effect. The same product, GreatChips, from the same manufacturer, will have the same resource "oneadr.com"

location address. On the product there is no information or way to deduct that these products might have different target systems. Consider that we have product item A and product item B as described above. For the example, a request (300) regarding the unique Identifiers (uid) (401) of a portion of serialized products (401) must be processed on traceability application (601) TA001 located in Brazil, as an other portion of the unique codes (400) representing serialized product items (401) must be processed in Frankfurt on traceability application (601) TA002. It is important to emphasize that these computer resources, the traceability applications (601) TA001 and TA002 are completely independent and separate from each other and hold zero knowledge about the other. As examples, a product item A is marked "oneadr.com/ABC" and a product item B is marked "oneadr.com/123" wherein ABC and 123 are their respective unique identifiers (400) uids. Product item A has a unique identifier (uid) (400) created and originated by application TA001 located in, say, Rio de Janeiro, likewise product item B has a unique identifier (uid) (400) created and originated by TA002 located in, say, Frankfurt.

The present invention provides a solution to direct the connection for a product item (401) to the correct intended traceability application (601) as explained even though there is no way that this can be resolved or otherwise be deducted solely by the information on the product item (401) itself. The information on the product item (401) as described is hence not sufficient to link a first request (300) to the originating traceability application (601). The method and system of the invention will however bridge the "gap", e.i. establish the link between the product item (401) and the intended appropriate traceability application (601) by using an intermediary traceability application director (500), hereafter called the traceability director (500). The traceability director (500) can be accessed by clients (200) using the information on any of all product items (401) using the one and constant network address (URI/URL), the network director address (700). The traceability director (500) essentially receives a request (300) from a client (200), or a user via a client (200), the request (300) comprising a unique identifier (uid) (400), and sends the request (300) to the constant network address (URI/URL), the network director address (700). The traceability director (500) uses a traceability application list or register (550). Essentially the traceability director (500) is a program resource entity that facilitates a client (200) reading a serialized code, namely the unique identifier (400) of a product item (401) to find the intended appropriate originating traceability application (601) and then link them together for further processing and interaction between the client (200) and the appropriate originating traceability application (500).

The traceability director (500) is a network computer and computing resource (proxy, network broker, etc), capable of operating and handling such resource as described related to the present invention. The traceability director (500) is implemented in a computer device that links and facilitates a product item (401) having a unique identifier (uid) (400), and the appropriate originating traceability application (601) among a plurality of traceability applications (600) In essence, the invention makes it possible to use a single resource address, the constant (or "static") network address, the network director address (700) to the network director (500) for one or more product items (401), each product item (401) being marked or associated with an unique identifier (uid) (400), and, using the network director (500) to (re) direct (510) the request (300) with the unique identifier (uid)(400) to its unique identifier ((uid)(400)—originating appropriate application (601) amongst a plurality of potential traceability applications (600)—of which only one appropriate originating application (601) shall process the request (300, 301).

Further, in an embodiment of the invention, the network traceability application director (500) is arranged to customize the response (800) from the appropriate originating traceability application (601) based on contextual information (333) based on the request (300, 301) itself.

Even though this description has adopted the assumption that on one single resource address, the network application director address (700), pointing to one network traceability application director (500) and from a plurality of product items (401), several resource addresses (700, 700') on a product item (401) might be employed as long as they resolve and connect to the network traceability application director (500).

In an embodiment of the invention it enables even higher efficient use of the application director (500) in situations where it is possible or feasible that the product item (401) can carry more information without other penalties or disadvantages relating to the QR-code or the employed marking technology itself, its printing and marking onto the product items (401).

In its simplest and most basic form a tracing system, a traceability application (600, 602, 601) receives an incoming second request (302), in other words basically a unique identifier (uid) (400), processes the second request (302), and then responds with a first response (800, 801, 808). In this situation basically the traceability application (602, 601) has two pieces of information, the unique identifier (uid) (400) itself and an address (707) to send the response back to. The information and response behaviours sent back will be governed by the rules set up by the traceability application (602, 601) for that unique identifier (uid) (400). The "richness" of a response (800, 850) for a product with a unique identifier (400) uid can vary with related to the application external information that follow the request. In this patent specification we will refer to this as contextual request information (CRI) (333). The contextual information CRI (333) is all information created or otherwise captured outside the application that is sent in the request (302, 301) to the traceability application (602, 601). This contextual information (CRI) (333) might be a user profile (202) identifying information about the user—or transactional information such as time or ip-address, cookies etc, or other network or session information. Especially a user profile (202) in the request (302, 301) that is recognized and managed by the traceability application (601) is valuable for orchestrating the best possible response (800, 808, 801, 850) to the request (302, 301). The amount and nature of the contextual request information CRI (333) is only limited by an actual transaction itself at any given time. By way of example we will explain how contextual request information CRI (333) may influence the response from the application. Using our example above, "www.oneadr.com/ABC", a second request (302, 301) where contextual request information CRI (333) is not used, the second response (850) from the correct originating traceability application (601) will be "Hello World". Any and all requests (302, 301) will have the very same second response (850) for this situation.

Now we will consider how a request (300, 302, 301) that sends contextual request information CRI (333) to the traceability application (602, 601) along with "oneadr.com/ABC" can change its response (800) based on the contextual request information CRI (333) or parts of the CRI. The contextual request information CRI (333) has an IP-address that resolves and indicates that the user is within Norway. The application is now sending another response based on this information for the same uid=ABC as described earlier. The response from the server, instead of "Hello World" is now in Norwegian language: "Hei på deg Verden!"

The way traceability systems based on codes and serialized codes are designed, there are two main categories of contextual request information CRI. The difference between these two categories are important to understand as they will have a different impact on how the CRI is used. Therefore for the invention we denote CRIx and CRIn. CRIx is external contextual information that is not known or controlled by the application. This is information that is typically about the request and the transaction itself, typically but not limited to IP-address, time, browser details, client information, versioning information, etc.

CRIn is contextual information that is native and in full or in part known and managed by the application. For instance when a request is incoming the user might pass along the request that the user has UserID=332 that is managed by the application. In other words the application has essential information about the request user.

For a very "rich" incoming request the contextual request information might effectively be conflicting with each other. In an embodiment of the invention, the originating traceability application (601) will have internal processing that will decide what is the appropriate response (800) even the incoming has information that considered isolated would have triggered different responses, as only a response for "consideration CRIx" is possible. Some contextual request information CRI (333) will therefore be overruled in favour over another that is indicating a particular response behavior—say for instance language.

In general terms—the native contextual information CRIn is the strongest information and will in most cases be the governing response indicator.

Again using the above example the native contextual information CRIn will now again change the response to the client (200) and user. Previously the CRIx indicated that the user was in Norway and the response was given in Norwegian as per originating traceability application (601) rules. This time however some native contextual information CRIn was also sent to the request (301). A Spanish user (Pedro) has a user profile (202) and that particular user has in that user profile (202) managed by the originating traceability application (601) selected that responses shall be in Spanish. One might perceive that this user was on travel in Norway when he desired to get access to the application by a request (300). The external contextual information CRIx that indicated a Norwegian response based on the IP-address is now by the application decided to be overruled by the user's own user profile (202) information about the response behavior. The response (800) back to the client (200) will therefore now be "Hola Mundo y Pedro".

The same unique identifier uid (400) with current invention responds differently based on the unique identifier uid (400) and the contextual request information CRI (333) whereby the response (800) might comprise a video message one time, and a text message another time, all based on the contextual request information CRI (333).

For the current invention the response (800), after the request (302, 301) has been received by the application (602, 601), is that it is the traceability application (602, 601), that processes the request ((302), 301) and decides and processes the response (800) and its behavior back to the client (200). The director (500) that sits in front of the plurality of traceability applications (600) does not hold any such rules or capabilities to that effect. The traceability application (602, 601) will have internal rules and methods for processing (or not) the second request (302, 301) and determining and processing the response (800) based on the incoming contextual request information CRI (333) with external CRIx and the potential native CRIn in combination being transferred to the traceability application (602, 601) in the request (302, 301). The response (800) by the traceability application (602, 601) is also concerning the correct return location, the response address/location (707) for the originating traceability application (601) and mapping for the response (800) further based on the unique identifier uid (400). The traceability application (602, 601), may after being determined as the originating traceability application (601) communicate with the user client (200) and any number of external applications (if otherwise allowed and possible) to further obtain information to decide how to respond. For instance, the originating traceability application (601) may receive a language setting, configuration or another preference setting from an external system that was facilitated by the user's client (200). Importantly this is still to be considered internal handling or handling rules and protocols by the originating traceability application (601), since the originating traceability application (601) is still in full and absolute control of the processing and analysis when preparing the best response and connection session (606) to the user and/or the client (200), because it is only to the user and/or client (200) the traceability application is "accountable" and answerable. All external information received and processed "internally" whatever the source by the traceability application is such only to be considered suggestive.

For instance a response (800) could simply be returned to "answer.com/44" based on unique identifier uid (400) ="ABC" for one given set of contextual request information CRI (333). However, since the CRI (333) so dictated the response (800) returned was "Authentic product" to "anysite.com" by JSON.

Importantly a response (800) may according to an embodiment of the invention not merely be determined and/or limited by the originating traceability application (601) alone. If the user and/or the user's client (200) client application (201) or application(s) has either forwarded contextual request information CRI (333) during discovering the correct originating traceability application (601) point, or later requested it after or during a session has been successfully established; then the originating traceability application's (601) response may be devised and composed due to a possible interaction with other external applications. As an example, if the request (301) came from an Amazon shopping app and that application managed a user profile (202) and the user's shopping details, the originating traceability application (601) could interact with the Amazon app (201), and related Amazon servers and databases to furnish a response (800) in the native Amazon app (201) where both applications contribute data in the response (800). The Amazon (native) data could be for instance concern a purchase order number and several other data natural to the app behavior, and further the Amazon app (201) could display or access a tracing history of a uniquely identified (400) product item (401) by data provided by the originating traceability application (601) exclusively.

One type of response (800) that is particularly useful is wherein the originating traceability application (601), based on the unique identifier uid (400) received and the rules ascending from that specific unique identifier uid (400), can invoke, trigger, map, and launch various other applications, whether these are internal to the traceability application "ecosystem" or external applications such as the Amazon shopping app (201) described above.

In an embodiment of the invention the response (800) may also forward and feed data and/or interfaces to target websites or other clients based on the rules that are associated with the unique identifier uid (400) in the originating traceability application (601). Significantly such a rules or response deciding method sets on how to potentially respond given the current circumstantial data, responded to any "random" application or client (200) is directly detected or derived from the unique identifier uid (400) within the originating traceability application (601), or, as an alternative, the response (800) might be also instructed by a client (200) in some situations as part of setting up a session. From this perspective the originating traceability application (601) can be considered as a context-reacting originating traceability application (601).

In an embodiment of the invention the format of the response (800) from the originating traceability application (601) might be of part contextual request information (333) sent from the requesting client (200) or its user where such specification or instructions are included. The format might be http, JSON, API, etc., only limited to the available formats and technologies available at the time of the request (302, 301). The format and instructions about how to respond might also be established during or after establishing a session/transaction/communication between the requesting client (200) or the user.

In an embodiment of the invention it enables a plurality of applications to interact with each other to access data for a unique identifier (400), a serialized code and a complete set of data that is concerning this product data (ascending from the serialized), including but not limited to aggregated track and trace data which includes a complete logistical and supply chain history. Its important that the user experience hence is realized by a co-operation and orchestration between the originating traceability application (601) and its interaction with a plurality of external applications.

The negotiation, handshaking, authentication, authorization, protocols, encryption schemas, session and transaction handling, implementation and necessary technical systems and methods, etc, to have two or a plurality of systems/applications interact with each other and the originating traceability application (601) in order to essentially permanently or transiently share data for any given situation and scenario is not further described herein.

The invention is particularly useful for a traceability application vendor when operating several traceability systems (100) for several different customers sharing a common global network entry point, i.e. same director (500) for all customers and unique identifier (400) marked product items (401).

A plurality of product items (401) are each provided with a unique identifier (uid) (400) and the common resource (virtual and partial) address, a network director address (700) which is used by a client application (201) in the client (200) for directing a request (300) to an application director (500).

The application director (500) is a computer implemented software which comprises a list (550) or register of traceability applications (602) that potentially can handle the second request (302, (301). The list is accessible to the director (500), but does not have to be accessible by the client (200). For security reasons it may be restricted that the client cannot access the list directly. The list (550) contains reference information about the resource address (702) for every potential traceability application (602, 601) on the list (550) and all the necessary information that is required to ask a traceability application (602, 601) for whether a unique identifier uid (400) was created and originated by the queried traceability application (602, 601). Importantly the director (500) does not have to processed, interpret or analyse the query for any purpose the external contextual information CRI (333) received by the client (200) or the user. It will only pass it to the application "as is" as a chunk of data. The list/register (550) managed by the network director (550) must initially be created and then later managed by the network director system (100) owner(s). This list (550) typically is updated manually or at regular intervals. The present invention does not concern itself with how the list is managed as it is considered a task expected to be satisfactorily handled by someone skilled in the art, how to manage the list.

In an aspect the invention is comprises the following steps;

The client (200) sends a request (300) comprising the unique identifier (400) uid read from the product item (401) to the application director (500) and including contextual information, both native CRIn and external CRIx as if and when available. The application director (500) will then based on the traceability application list (550) determine which traceability applications (600) shall be forwarded the request (300). This is achieved as the application director (500) will convey the unique identifier uid (400) to the potential traceability applications (600, 602, 601) and ask for a response (800) back whether the unique identifier uid (400) was created and originated by the queried traceability application (600, 602, 601). In its basic form this is a binary response of yes/no nature. A "No" response (801) is returned from a non-originating traceability application (602), A "Yes" response (808) is returned from an originating traceability application (601).

There are several methods and strategies that the application director can deploy for contacting the applications on the list, and in such a way lower the traffic burden and as well shorten the time to receive an affirmative "yes" from the correct application (601). For instance a sequential approach might be used, please see FIG. 1, wherein the application director (500) simply starts on top of the list (550) and asks that application (602, 601) whether it is the correct one originating traceability application (601), please see FIG. 1 If the answer (800, 802) is "no" the second application (602, 601) on the list will be asked, and so on until a response (800, 808) "yes" will be received and the correct originating traceability application (601) has been found. Then the director (500) does not have to proceed further on the list (550). This may be advantageous if some of the empirically most used/most queried traceability applications on the list (550) are sorted to the top and the list (550) is in descending order. Another strategy is to ask all applications (600, 602, 601) on the list (550) simultaneously and filter all the incoming answers from the application to find the positive response (808) "yes" and then the correct originating traceability application (601) has been found. Or there might be other strategies that can combine the above or use grouping or sorting of the list that will lead to the answer the fastest possible way. Or the method can be designed and optimised to reduce traffic load. The director (500) can within the scope of the invention comprise an analysing method, algorithm or tool that will employ an efficient query method based on the list.

Since a request is typically encoded as an Uniform Resource Identifier (URL) or Universe Resource Locator (URI), the size of the request is less than 1 KB in size, so the network load is trivial.

Further it is possible to distribute the traceability application list (550) by creating and managing copies (550') that can be distributed on one or more network director replicas (500)' that can be used in the same manner as network director (500) in a load balancing schema. This will enable optimization of network traffic, for instance larger regions might have one director copy/replica (500') such that a "local" request (300) is routed to that network director (500') first and such reduces the latency of the request (300) to a director coming from that region.

After the correct originating traceability application (601) has been identified by the director (500), the director (500) facilitates (606) a direct session and further transactions between the client (200, 201) and the originating traceability application (601). After the session and connection (606) between client (200) and originating traceability application (601) has been confirmed, the director (500) communication is dropped from the request and the task for the request is completed for the director.

The director (500) might generate and store a secured request log.

The contextual information (333) is passed to the originating traceability application (601) that may at its own discretion potentially use this information to further compose the best response (800) to the client (200).

Essentially prior art uses contextual information (i.e. information external in relation to the application itself) for two main purposes; firstly routing a request to the correct application resource, and then having the resource compose a response based on said contextual information.

Comparing prior art and the current invention one fundamental aspect of the current invention is to be observed. As opposed by prior art, the current invention is exploiting two fundamental and constantly present attributes of traceability systems that are based on using unique identifiers, "uid"s. Firstly, any such traceability application is capable of responding conclusively based on the uid only whether the uid was created and originated by that application. That means that the uid on a product or any object associated with the uid can be used without any contextual information whatsoever to determine the right traceability application for the uid in question. The traceability application only needs the unique identifier uid to determine this. Secondly, when the uid has been recognized by the application in reality the application has the capabilities and the sufficient internal information to itself compose a customized response to the request. If not, it can simply demand or request such information from the user or the requesting client as per session and requirements.

In one embodiment of the invention, the traceability application might not have created the unique identifier uid or it was not originated within that first traceability system. However, due to the architecture of the total overall traceability system the traceability application within the present invention is the connection represented with the first and correct entry point to the overall traceability system as a whole. It is such per definition the correct, originating traceability application (601) even if there are underlying or connected systems that actually created the unique identifier uid. That is to say that in this situation a plurality of applications that are coupled, linked or otherwise connected with other, the traceability application is considered to be where the first point of entry for the uid that can be determined or discovered, even thus the originating traceability application (601) per se might not be the creator of the uid or even not the originating application. In this situation technically the invention is carried out essentially in the same way. The definition of the traceability application used by the invention is then expanded to also encompass an application that manages said uid by having been delegated authority and ascendancy of a system that originally created and originated the uid.

Another problem with prior art that is solved with the current invention is especially the contextual information that is particularly related to a given user. This information is what has the highest information density about how the application should behave since this contains the "wishes", preferences and chosen configuration parameters of the user. However, this creates a problem for prior art since this information must be considered sensitive and shall to the least possible extent be stored outside the application. This fact might limit in practise the contextual information accessible by the redirector as described in prior art.

There are no such limitations for the current invention since it only is used and processed by the originating traceability application (601) and it does not have to leave the originating traceability application.

Moreover, in the current invention, the application, once having made the connection (606) with the client based on the uid yes response only, can during the communication and session ask for this type of information to drive the response and interaction forward.

In other words, even the current invention can make use of external contextual information from the user and client, the basic technical effect is to find, locate access the right and originating traceability application, and realise that once this is achieved the originating traceability application (601) itself will handle the remainder of the communication properly essentially in the same way if the uid and product in fact had a native resource address to the originating traceability application directly.

REFERENCE NUMBERS

| | |
|---|---|
| 100 | Traceability application network director system |
| 101 | Network |
| 200 | Client used by user 205 |
| 201 | app on client (200) |
| 202 | user profile for user (205), authorisation for the user (205) to interact with the client (200) vis a vis the network traceability |

-continued

| | |
|---|---|
| | director (500) mentioned below. |
| 205 | user with user profile (202) |
| 300 | first Request received by the network director (500) |
| 301 | second Request received by the originating traceability application (601) |
| 302 | second Request received by a traceability application (602) |
| 333 | Contextual (CRIn, CRIx) request information, CRI |
| 400 | Unique identifier (UID) |
| 401 | Object associated with an unique identifier |
| 500 | Network traceability application director |
| 550 | List/register of traceability applications |
| 600 | Plurality of traceability applications |
| 601 | (The unique identifier) Originating traceability application |
| 602 | Traceability application |
| 606 | Connection/session facilitated between two applications/clients/computer systems |
| 650 | Data_A from originating traceability application (601) |
| 700 | Address/location to the network director (500) |
| 702 | Address/location for a traceability application |
| 707 | Response address/location for an originating traceability application |
| 800 | Response from a traceability application |
| 801 | "No" response from a non-originating traceability application |
| 808 | "Yes" response from a non-originating traceability application |
| 820 | "UID/system not found" response |
| 900 | First computer system ("Retailer/Vendor") |
| 910 | User profile in first computer system (900) |
| 950 | Data_B from first computer system (900) |
| 960 | Function_C using data_B (950) and data_A (951) to make data_C (953). |
| 961 | Data_C from fuction_C (952). |

The invention claimed is:

1. A method for establishing or facilitating a network connection (606) between a client computing device (200) and an originating traceability application (601) and between said originating traceability application (601) and a first computer system (900) as well as between said first computer system (900) and said client computing device (200) in a network (101) and combining data (650, 950) from said originating traceability application (601) and the first computer system (900), said method comprising:

maintaining, by a network director (500) being implemented on a computer system, a list (550) of a plurality of resolvable resource network addresses (702) of a plurality of corresponding traceability applications (600, 602, 601), said plurality of corresponding traceability applications (600, 602, 601) being implemented on second computer systems;

originating or managing by said traceability applications (600, 602, 601) a plurality of unique identifiers (400) associated with a plurality of serialized product items (401), each of the plurality of serialized product items (401) being associated with a corresponding unique identifier (400), each said unique identifier (400) being originated or managed by an associated originating traceability application (601) within said plurality of said traceability applications (600), all said serialized product items (401) being associated with a network address (700) resolvable for the network director (500);

receiving by said network director (500) an initial request (300) comprising said unique identifier (400) sent from the client computing device (200) which has read said unique identifier (400);

sending by said network director (500) a subsequent request (302) comprising said unique identifier (400) to one or more of said resource network addresses (702) of said corresponding traceability applications (602, 601), for receiving a first response (800) whether said traceability application (602, 601) recognizes said unique identifier (400) as originating from or managed by said traceability application (602, 601);

each of said corresponding traceability application (602, 601) analyzing said unique identifier (400) to determine whether it can resolve said unique identifier (400) thereby identifying itself as an originating traceability application (601) of said unique identifier (400);

sending by said originating traceability application (601) of said unique identifier (400), said first response (800, 801) to said network director (500) after said originating traceability application (601) of said unique identifier (400) determines it can resolve said unique identifier (400);

receiving by said network director (500) said first response (800, 801) to said subsequent request (302);

in response to the first response being a positive or affirmative response (808) from said originating traceability application (601), establishing by said network director (500) a connection (606) between said requesting client computing device (200) and said originating traceability application (601);

establishing by said affirmative responding traceability application (601) a connection (606) to a first computer system (900);

establishing by said first computer system (900) a connection (606) to the client computing device (200);

exchanging by said originating traceability application (601) and said first computer system (900) a first and a second set of data (650, 950); and federating the first set of data (650) from said originating traceability application (601) and the second set of data (950) from said first computer system (900) and processing said first and/or second set of data (650, 950) by a function (960) to generate a third set of data (961).

2. The method of claim 1, wherein said function (960) originates in either the first computer system (900) or the originating traceability application (601).

3. The method of claim 2, wherein if said response (800, 801) is negative ("no") (801), said network director (500) disregards said response (800, 801).

4. The method of claim 3, wherein each traceability application (602, 601) receiving said second request (302) is programmed to analyze said unique identifier (400) to determine whether it can resolve said unique identifier (400) thereby identifying as an originating application (601) of said unique identifier (400), or reject/disregard said second request (302).

5. The method of claim 4, wherein said network director (500) is arranged to send said second request (302, 301) to one by one of each traceability application (602, 601) in said list (550), until said response (800, 801, 808) is a positive response (808), and then not sending a further second request (302) to further traceability applications (602) in said list (550).

6. The method of claim 5, wherein said second request (302, 301) to said application (602) includes contextual information (333), said contextual information (333) comprising an instruction (333, 334) to not return a negative response (801) in case said traceability application (602) is not an originating traceability application (601) of said unique identifier (400).

7. The method of claim 6, wherein, if an affirmative "yes" response (808) has not been received when said list (550) of traceability applications (600) is exhausted, then return a response (800, 820) indicating that the originating traceability application (601) is "not found" to said network director (500) or said client (200).

8. The method of claim 7, said method managing unique identifiers (400) and aggregated track and trace information based on said unique identifier (400), whereby said traceability application (602, 601) conducts the steps of:

a) receiving contextual information (333) pertinent and applicable to said second request (302, 301) itself together with said unique identifier (400); and b) composing a response (800, 808) according to and based on internal rules and instructions associated with said unique identifier (400) and/or said received contextual information (301, 333).

9. The method of claim 8, wherein said unique identifier (400); and said network director address or location (700) are included in a QR code or similar scannable label on said serialized product item (401).

10. The method of claim 4, wherein said network director (500) is arranged to send said second request (302, 301) simultaneously to all traceability applications (602, 601) in said list (550).

11. The method of claim 10, wherein said second request (302, 301) to said traceability application (602) includes contextual information (333) comprising an instruction (333, 334) to not return a negative response (801) in case said traceability application (602) is not an originating traceability application (601) of said unique identifier (400).

12. The method of claim 11, wherein, if an affirmative "yes" response (808) has not been received when said list (550) of resolvable network addresses/locations (702) directing to traceability applications (600) is exhausted, then return a response (800, 820) which is a unique identifier (400) that the originating traceability application (601) is "not found" response (820) to said network director (500) or said client (200).

13. The method according to claim 12, said method managing unique identifiers (400) and aggregated track and trace information based on said unique identifier (400), whereby said traceability application (602, 601) conducts the steps of:

a) receiving contextual information (333) pertinent and applicable to said second request (302, 301) itself together with said unique identifier (400); and b) composing a response (800, 808) according to and based on internal rules and instructions associated with said unique identifier (400) and/or said received contextual information (301, 333).

14. The method of claim 13, wherein said first computer system (900) comprises a first user profile (910) associated with a user (205) on said user app (201), said first user profile (910) comprising said second set of data (950).

* * * * *